United States Patent [19]

Hanssens et al.

[11] Patent Number: 5,145,577
[45] Date of Patent: Sep. 8, 1992

[54] PULSED COLUMN WITH BASKET LINING

[75] Inventors: Alain Hanssens, Tresques; Michel Morin, L'Isle Sur Sorgue, both of France

[73] Assignee: Commissariat A L'Energie Atomique, Paris, France

[21] Appl. No.: 713,975

[22] Filed: Jun. 11, 1991

[30] Foreign Application Priority Data

Jun. 21, 1990 [FR] France .................. 90 07789

[51] Int. Cl.⁵ .............................................. B01D 24/28
[52] U.S. Cl. ................................... 210/189; 210/268; 210/284
[58] Field of Search ................. 210/189, 268, 284; 209/158, 159, 455, 456

[56] References Cited

U.S. PATENT DOCUMENTS

| | | | |
|---|---|---|---|
| 2,742,381 | 4/1956 | Weiss et al. | 210/268 |
| 3,307,700 | 3/1967 | DeNevers | 210/189 |
| 3,768,650 | 10/1973 | Zievers | 210/189 |
| 3,881,876 | 6/1975 | Porter et al. | 209/159 |

FOREIGN PATENT DOCUMENTS 721062 12/1954 United Kingdom .

OTHER PUBLICATIONS

Soviet Inventions Illustrated (Derwent Publication), Sep. 1978.

*Primary Examiner*—Stanley S. Silverman
*Assistant Examiner*—Cynthia L. Nessler
*Attorney, Agent, or Firm*—Pearne, Gordon, McCoy & Granger

[57] ABSTRACT

The present invention is directed towards a lining of a pulsed column which allows for an extended exchange of the solid phase with the liquid phase. The lining is composed of stacked baskets and rings, the baskets having a perforate bottom and the rings having a central hole. The size of the perforations in the baskets are such that the solid phase is retained therein while the central hole in the rings allows the solid phase to pass therethrough and go on to the next lower basket. The inside of the column is subjected to high frequency, low energy pulsations which move the liquid and solid phase in a back-and-forth manner. Additionally, the inside of the column is subjected to extremely low frequency, high energy pulsations so as to remove one portion of the solid phase located in a basket and cause it to go down towards a next lower basket.

5 Claims, 2 Drawing Sheets

PULSED COLUMN WITH BASKET LINING

FIELD OF THE INVENTION

The present invention concerns pulsed columns embodying an exchange or extraction between one solid phase and one liquid phase generally circulating counter-flow. The result of the intimate mixture embodied in the pulsed column is the exchange or transfer of a product, such as a solute from one phase into the other. It is thus possible to use ion exchanger resins to extract compounds present in aqueous solutions, in particular in hydrometallurgy or agro-alimentary applications.

BACKGROUND OF THE INVENTION

The pulsed columns generally comprise an upper portion equipped with one inlet of the heavy phase, namely the solid phase, and one outlet of the light phase, namely the liquid phase. The exchange takes place during the respective fall and rise of the two phases in a cylindrical central portion with a vertical axis and provided with a lining intended to favor contact between the two phases. One lower portion terminates the central portion and comprises one inlet of the light phase and one outlet of the heavy phase. The effectiveness of the transfer of a substance, such as a solute, from one phase into the other more particularly depends on the quality of the contact between the two phases. Thus, the column is equipped with a pulsation device making it possible to generate a continuous to-and-fro movement of the unit constituted by the two liquid and solid phases.

When the pulsed column is functioning, the heavy phase descends by gravity and the liquid phase rises. The linings are generally constituted by perforated plates or chicanes constituting temporary obstacles to the direct routing of the two phases. The pulsations transmitted into the mixture favor the contact between the two phases.

Generally speaking, the solid-liquid extraction dwell times need to be long since the exchange kinetics are slow. Thus, it is vital to have relatively high pulsed columns so as to obtain good efficiency. In fact, the solid phase, introduced at the top of the column, circulates by gravity by gradually moving too quickly past the various obstacles constituting by the lining inside the pulsed column.

The object of the invention is to overcome this drawback by modifying the design of the lining of the solid-liquid pulsed columns so as to ensure long dwell while observing the agitation conditions required for transfer of the solute to be extracted.

SUMMARY OF THE INVENTION

To this effect, the object of the invention is to provide a pulsed column for exchange between one liquid phase and one solid phase and comprising:

a column body inside which a lining is placed in order to favor contact between the liquid phase and the solid phase;

means for pulsation of the unit constituted by the liquid phase and the solid phase with the aid of a first low energy, high frequency pulse.

According to the invention, the lining is an alternate stacking of baskets and horizontal rings so that the solid phase successively fills the baskets and gradually passes through the rings it descends inside the column body. So as to authorize the descent of the solid phase, the pulsing means are provided so as to supply high energy but low frequency pulses making ti possible to remove at specific times the elements of the solid phase from a basket so that they fall back into the basket situated below.

Thus, it is possible to control the dwell time of a determined quantity of the solid phase in a basket and accordingly control the dwell time of the solid phase in the pulsed column.

Preferably, stacking is embodied by means of several peripherical stanchions placed inside the column body and in the middle of which the baskets and rings are slidingly mounted.

So as to position the baskets and rings between them, braces are used around the stanchions.

Preferably, each basket comprises a perforated bottom. Each ring may comprise a central hole so as to canalize the solid phase in the center of the shaft to the outlet of each basket. The solid phase leaving a basket thus inevitably falls into the basket situated immediately below.

BRIEF DESCRIPTION OF THE DRAWINGS

The present invention and its various characteristics shall be more readily understood from a reading of the following description with reference to the accompanying figures, namely respectively.

DETAILED DESCRIPTION OF THE PREFERRED EMBODIMENTS

Figure 1:
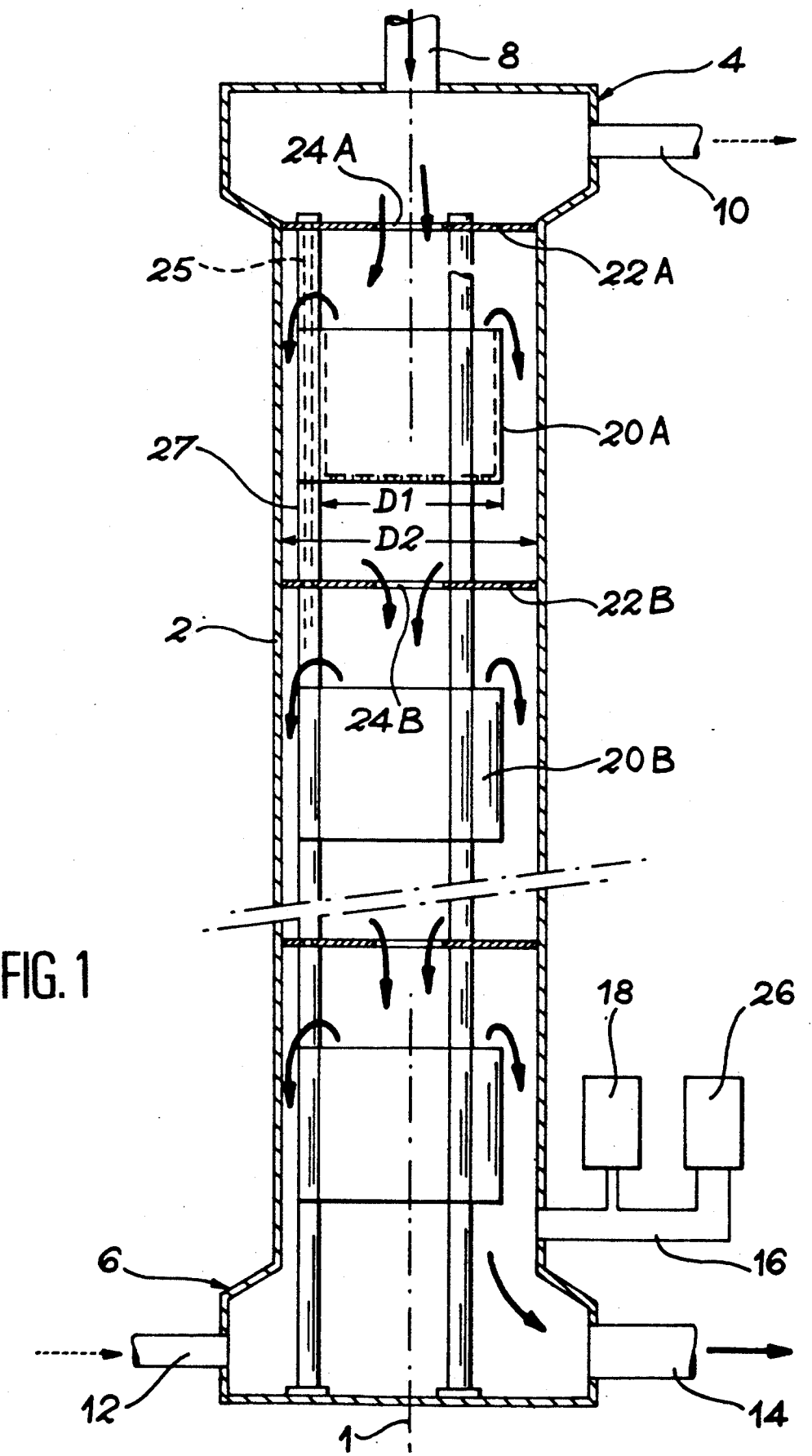
FIG. 1 shows a cutaway view of a pulsed column of the invention illustrating the functioning of said column.

The pulsed column of FIG. 1 principally includes the shaft 2 of the column, having a vertical axis 1 inside which the exchange is effected, surmounted by an upper decanter 4 and resting on a lower decanter 6.

The upper decanter 4 includes an upper inlet 8 of the heavy phase, that is the solid phase. It also has one upper outlet 10 of the light phase, that is the liquid phase. Similarly, the lower decanter includes one lower outlet 14 of the solid phase and one lower inlet 12 of the liquid phase.

Pulsation means are shown diagrammatically by a pipe 16 opening into the lower portion of the shaft 2 and connected to a first compressed air source 18. The pulsation means is able to apply a periodic pressure to the liquid phase/solid phase mixture in the shaft so as to transmit to them a to-and-fro movement. The pulsation is a low energy pulsation but with a relatively high frequency so as to ensure a fluidization of the solid particles inside the liquid.

According to the invention, the lining of the shaft 2 is constituted by a stacking of several baskets 20 with rings 22 inserted between them. Each basket is horizontal and open via the top. The first basket 20A is preferably surmounted by a first ring 22A.

Each ring 22 (22A or 22B) is pierced by a central hole 24 (24A or 24B). The solid phase derived from the upper inlet 8 is thus brought to pass inside the first central hole 24A of the first ring 22A, as shown by the upper arrows. In this way, the solid phase starts to fill the first basket 20A. The solid phase gradually fills this basket while being constantly subjected to the low energy, high frequency pulsation. The exchange between the liquid phase and the solid phase is thus effective during this filling.

According to the invention, the pulsed column has pulsation means able to generate, at adjustable periods, a high energy pulsation. The second pulsation means is symbolized by a second compressed air source 26 connected to the pipe 16. In this way, once the first basket 20A has been filled, a high energy pulse is supplied by the pulsation means, in this case the second compressed air source 26, so that the contents of this first basket 20A are completely expelled so as to fall back outside the latter. In fact, each basket 20 has an external diameter D1 smaller than the internal diameter D2 of the shaft 2. The solid matter expelled is then canalized by the second ring 22B. After having moved past the second hole 24B, the solid phase falls via gravity into the second basket 20B.

The process is thus renewed so as to have the solid phase move from one basket to another by means of gravity with the rate of the high pulsations imposed by the second compressed air source 26.

Thus, it is possible to adjust the rate of the descent of the solid phase and thus manage the time for exchanging this solid phase with the liquid phase in each basket 20. During its dwell time in a basket 20, the solid phase is constantly maintained in suitable fluidization conditions allowing for material exchange with the liquid phase. The amplitude of the low energy pulsations is not sufficient to remove the solid phase accumulated in each of the baskets.

It is possible to select the geometry and spacing of each basket 20 and ring 22. It is also possible to adjust the frequency of the two types of pulsations. The positioning and fixing of the baskets 20 and the rings 22 are preferably embodied with the aid of stanchions 25. The latter are positioned at the periphery of the internal volume delimited by the shaft 2. The baskets have peripheral guides 29 constituted by sleeves welded to the cylindrical structure of the baskets 20. The stanchions 25 and the guides 29 are orientated along the vertical axes 28. As the positioning of the guides corresponds with the position of the stanchions 25, it is thus possible to embody a stacking of the baskets 20 by joining the guides 29 onto the stanchions 25.

Figure 2:
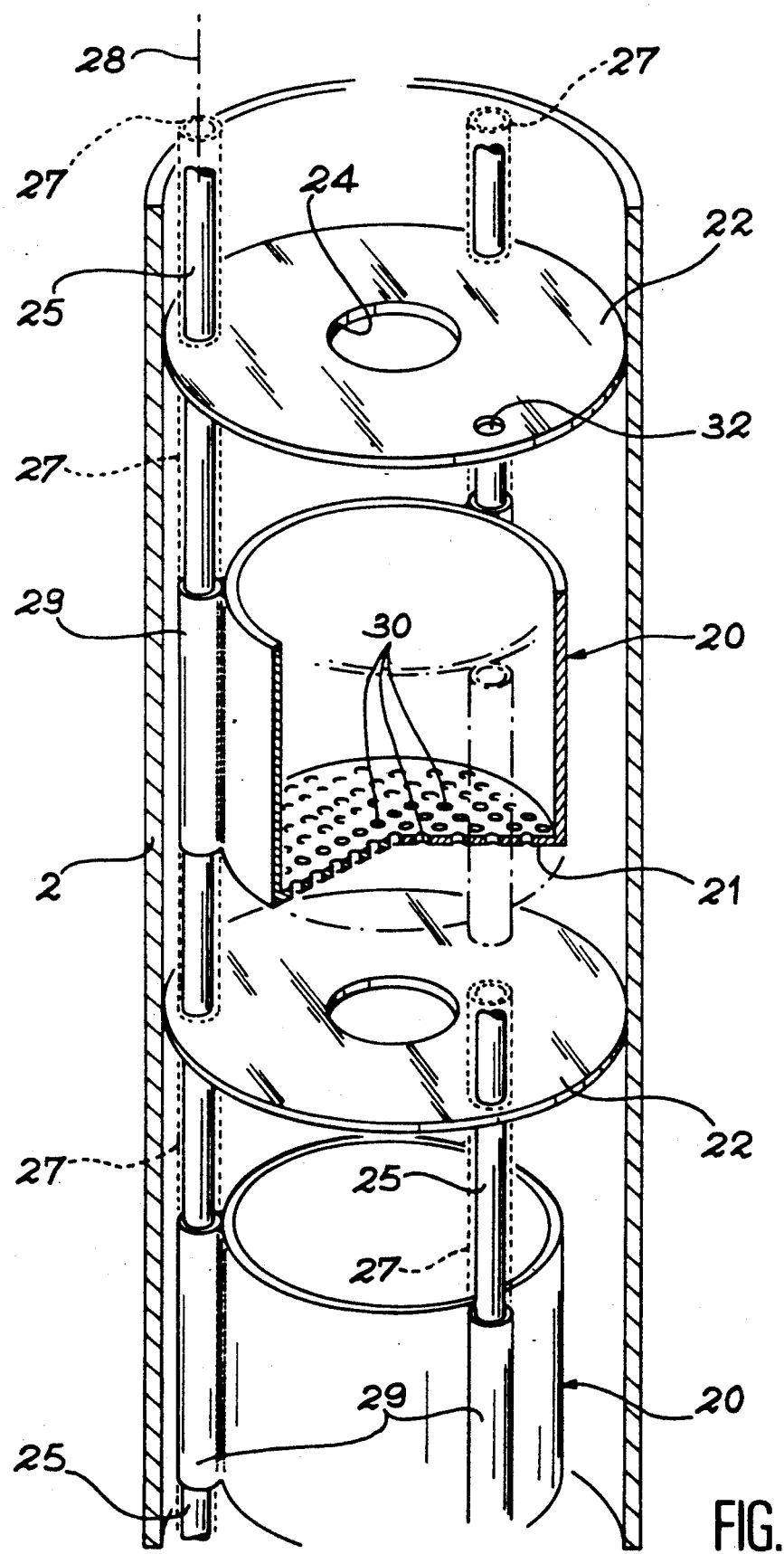
FIG. 2 shows a partial perspective view of the pulsed column of the invention and illustrating the details for mounting the lining.

In the embodiment shown on FIG. 2, there are three stanchions 25 spaced angularly by 120 degrees around the main axis 1 of the shaft 2. This merely constitutes one embodiment example.

The mounting of the rings 22 is effected similarly with the aid of the stanchions 25. In order to correspond, passages 32 are made in the rings 22 at the same locations as the guides 29, that is centered around the vertical axes 28 of the stanchions 25. The rings 22 thus form part of the stack of the baskets 20.

The heightwise spacing of the baskets 20 and rings 22 is embodied by means of braces 27. These may also be constituted by sleeves able to be threaded around the stanchions 25. The lining may be embodied by the successive stackings of a brace, a basket, a brace, a ring, a brace, a basket, a brace, a ring, and so on.

The choice of the spacing of the baskets and rings constituting the lining and control of the pulsations makes it possible to obtain in the column diverse adjustable values of the dwell time of the solid phase inside the shaft.

In FIG. 2, the bottom 21 of the basket 20 has been shown partially provided with orifices 30. In fact, it is preferable that the bottom 21 of each basket 20 is able to be embodied with the aid of a perforated plate or a metallic or plastic fabric allowing for passage of the liquid phase and yet ensuring stoppage of the solid phase inside the basket 20. The diameters of the orifices 30 are thus smaller than the major portion of the solid particles constituting the heavy phase.

The external diameter of a ring 22 preferably corresponds to the internal diameter D2 of the shaft 2.

This type of lining is easily able to be adapted for a solid phase constituted by ion exchanger resin or any spectrum calibrated divided solid, as well as for a liquid phase concerning hydrometallugy or agro-alimentary activities.

The dwell time of the solid phase in the pulsed column for extraction is considerably increased with respect to chicaned lining usage. This technique is particularly advantageous during the elution of ion exchanger resins when transfer kinetics are generally slow.

Thus, it is possible to use installations whose column height does not currently exceed six meters.

The pulsation means have been represented by two different compressed air sources 18 and 26. This only represents one embodiment example and a mixed pneumatic or mechanical device may also by used.

What is claimed is:

1. Exchange pulsed column functioning with one liquid phase and one solid phase and including:
a column shaft inside which a lining is placed to favor exchange between the liquid phase and the solid phase;
a first means for pulsation of both the liquid phase and the solid phase, said first pulsation means supplying a low energy, high frequency pulsation, wherein the lining is an alternate stacking of baskets and horizontal rings so that the solid phase successively fills the baskets and gradually passes through the rings as it descends inside the shaft, a second pulsation means for producing high energy, low frequency pulsations for removing at specific moments the elements of the solid phase from a basket so that they fall back into the basket situated immediately below.

2. A pulsed column according to claim 1, further including peripheral stanchions placed inside the shaft and along which baskets and rings are slidingly mounted.

3. A pulsed column according to claim 2, further including braces mounted around the stanchions so as to position the baskets and the rings between them.

4. A pulsed column according to claim 1, wherein each basket includes a perforated bottom.

5. A pulsed column according to claim 1, wherein each ring includes a central hole so as to canalize the solid phase at the center of the shaft to the outlet of each basket.

* * * * *

UNITED STATES PATENT AND TRADEMARK OFFICE
CERTIFICATE OF CORRECTION

PATENT NO. : 5,145,577

DATED : September 8, 1992

INVENTOR(S) : Alain Hanssens, et al.

It is certified that error appears in the above-identified patent and that said Letters Patent is hereby corrected as shown below:

Column 1, line 50, after "dwell" insert --times of the solid phase inside the pulsed column,--.

Signed and Sealed this

Seventh Day of September, 1993

Attest:

BRUCE LEHMAN

Attesting Officer

Commissioner of Patents and Trademarks